United States Patent
Morikawa et al.

[11] Patent Number: 5,146,683
[45] Date of Patent: Sep. 15, 1992

[54] REINFORCEMENT CUTTER

[75] Inventors: Sumio Morikawa, Sakai; Nobuyuki Zakoji, Toyonaka, both of Japan

[73] Assignee: Oyodokomatsu Company, Limited, Osaka, Japan

[21] Appl. No.: 750,682

[22] Filed: Aug. 27, 1991

[30] Foreign Application Priority Data

May 20, 1991 [JP] Japan .................. 3-45672[U]

[51] Int. Cl.⁵ .................... B23P 19/00; E02F 3/28
[52] U.S. Cl. ........................... 30/134; 30/258
[58] Field of Search ............ 30/134, 135, 124, 258

[56] References Cited

U.S. PATENT DOCUMENTS 4,519,135  5/1985  LaBounty .................. 30/134

Primary Examiner—Douglas D. Watts
Attorney, Agent, or Firm—Millen, White & Zelano

[57] ABSTRACT

The present invention provides a scissor-action reinforcement cutter comprising a lower jaw and an upper jaw which is of smaller profile than the lower jaw, a first and a second shearing cutter means dismountably secured to each of opposed inner lateral surfaces of the upper and lower jaws in a bent formation in the longitudinal direction of the jaw, and a hydraulic cylinder operatively associated with the jaws, the lower jaw being provided with a through-opening in a forward part thereof to accept a foreard end portion of the upper jaw in such a manner that the first shearing cutter means of the upper and upper jaws intersect each other to grip a work to be cut, the lower jaw being provided with a land series configured generally in the shape of the capital letter L around the through-opening, the shearing cutter means being disposed along the long lateral side of the land series, and a clearance being provided between the short side of the land series which is opposite to the side of the lower jaw on which the corresponding shearing cutter means are disposed and the side of the upper jaw which is opposite to the side on which the corresponding shearing cutter means are disposed.

2 Claims, 3 Drawing Sheets

REINFORCEMENT CUTTER

FIELD OF THE INVENTION

The present invention relates to a reinforcement cutter of the exclusively shearing type which is used in demolition and other works.

BACKGROUND OF THE INVENTION

In the demolition of iron-or steel-reinforced concrete structures, a reinforcement cutter attached to a power shovel is generally employed. Regarding the reinforcement cutter, the following proposal has been made, for instance. (cf. Japanese Patent Publication No. 62-17059).

This cutter comprises a couple of jaws which are opposedly disposed and adapted to relatively swing to open and close between a pair of side plates, with bases of the respective jaws being connected to a hydraulic cylinder, a swivel member consisting of a swivel end plate and a locking end plate as attached to bases of said side plates, said jaws being provided with shearing cutters on mutually opposed inner sides thereof along the longitudinal direction thereof (front and back as viewed from the operator), crushing cutters of lower profile than said shearing cutters in positions forwardly of said shearing cutters, said crushing cutters being configured in the shape of the capital letter V in sectional view and not intersecting each other when the jaws are closed, and intermeshing stop means adapted to prevent lateral dislodging of the cutting work as disposed further forwardly of said crushing cutters.

Therefore, in the proposed reinforcement cutter, the cutting work such as a steel reinforcement is first crushed by the crushing cutters and, then, the jaws are advanced to cut the crushed work with the shearing cutters. In case the cutting work is a thin member, the work is partially entrapped between the cooperating shearing cutters to expand the lateral clearance of these cutters, that is to say a lateral cutter displacement takes place but, to prevent this displacement, the juxtaposed jaws are interlocked with each other.

Although the lateral displacement of shearing cutters in cutting is precluded in such proposed reinforcement cutter, the cutting work tends to slide forwards or towards the low-profile crushing cutters in the shearing phase so that the proposed cutter has the disadvantage that it can be applied only to easily crushable small-sized work.

On the other hand, Japanese Kokai Patent Application No. 57-18461 discloses a reinforcement cutter comprising a stationary jaw and a movable jaw which are opposedly disposed to open and close, said stationary jaw having a longitudinally extending slit while said movable jaw having a curved hook forwardly of its shearing cutter so that when said hook is engaged with said slit prior to cutting, not only the lateral displacement of the shearing cutters but also the forward slide of the work is prevented. In other words, this reinforcement cutter grips the work and cuts it.

However, inasmuch as the above reinforcement cutter grips the work securely by the hook and slit means and cuts the work in that constrained condition with the shearing cutters, the forward slide of the work applies a destructively excessive force to the hook when the rigidity of the work is high, so that the cutter can be applied only to the cutting of small beams, pipes, cables and the like.

As apparent from the foregoing review of the prior art, the conventional reinforcement cutter construction has little room for any remarkable improvement in cutting performance and cannot deal with unpredicted jobs such as cutting of unusually tough structural members.

SUMMARY OF THE INVENTION

Developed to overcome the above-mentioned disadvantages of the prior art, the present invention provides an exclusively shearing or scissor-action reinforcement cutter comprising a lower jaw and an upper jaw which is of smaller profile than the lower jaw, a first and a second shearing cutter means dismountably secured to each of opposed inner lateral surfaces of said upper and lower jaws in a bent formation in the longitudinal direction of the jaw, and a hydraulic cylinder operatively connected to said jaws, said lower jaw being provided with a through-opening in a forward part thereof to accept a forward end portion of said upper jaw in such a manner that said first shearing cutter means of said upper and upper jaws intersect each other to grip a work to be cut, said lower jaw being further provided with a land series configured generally in the shape of the capital letter L around said through-opening, said shearing cutter means being disposed along the long lateral side of said land series, and some clearance being provided between the short side of said land series which is opposite to the side on which the corresponding shearing cutter means are disposed and the side of said upper jaw which is opposite to the side on which the corresponding shearing cutter means are disposed.

The construction and operation of the present invention are now described in detail with reference to the accompanying drawings.

Figure 1:
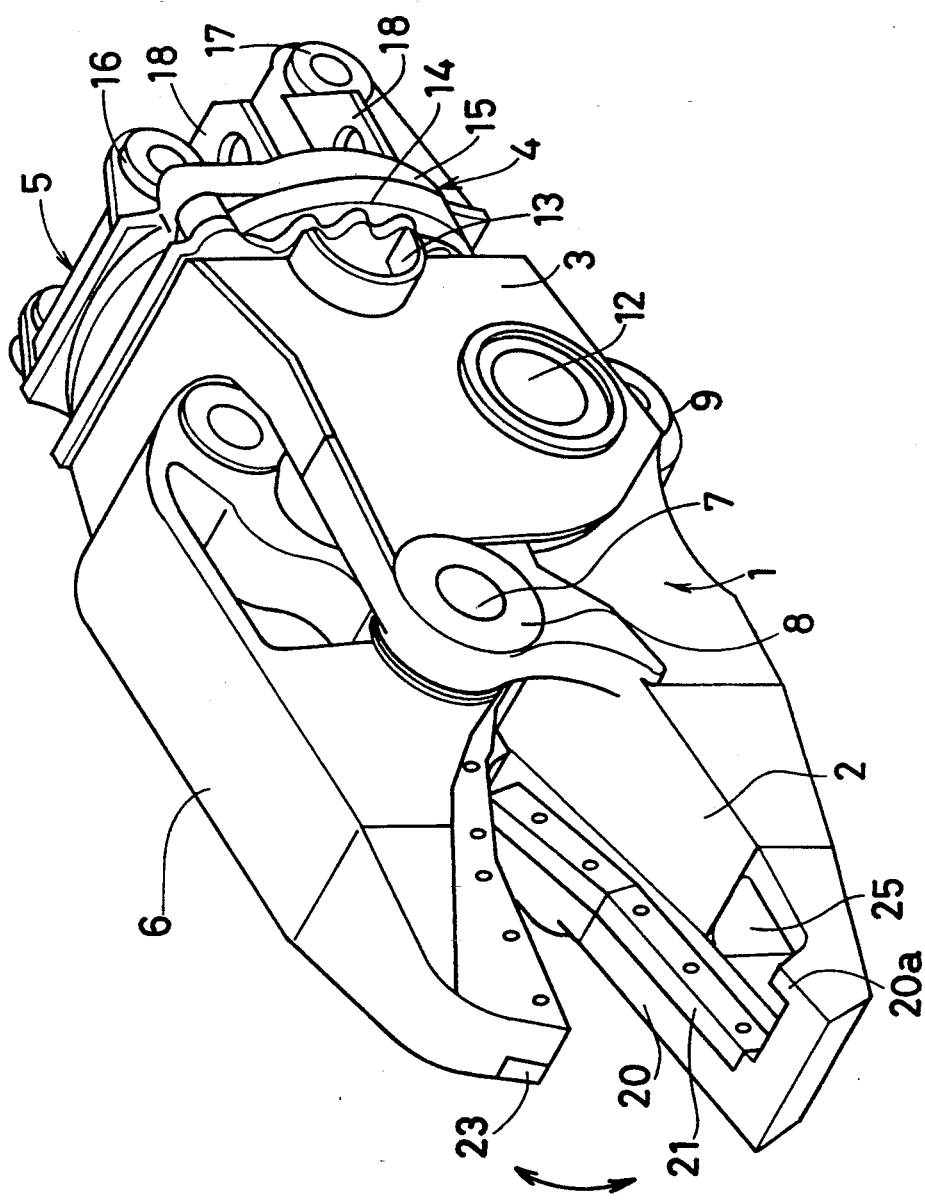
FIG. 1 is a perspective view showing an embodiment of the invention.
Figure 2:
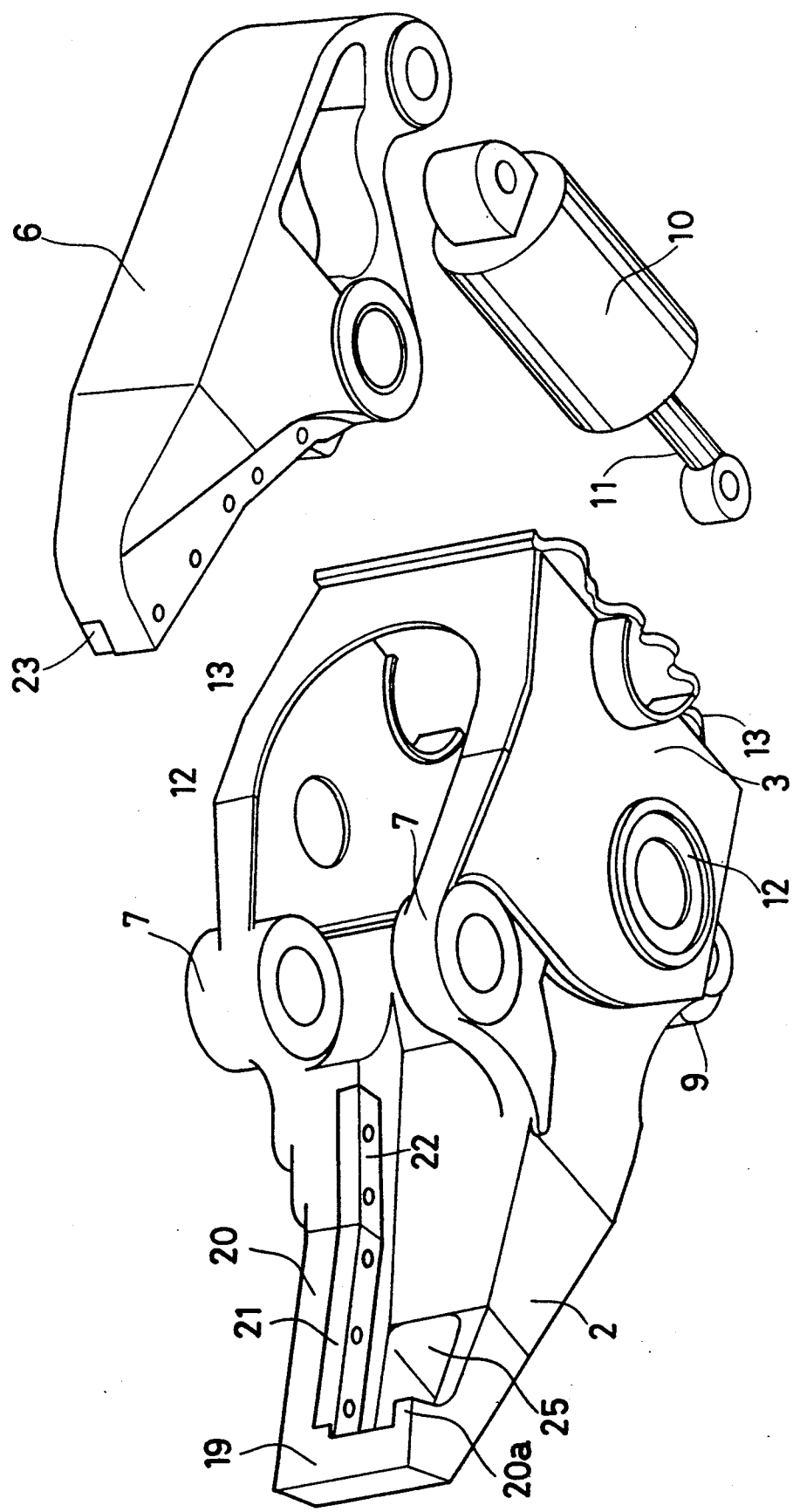
FIG. 2 is an exploded perspective view showing the essential part of FIG. 1.
Figure 3:
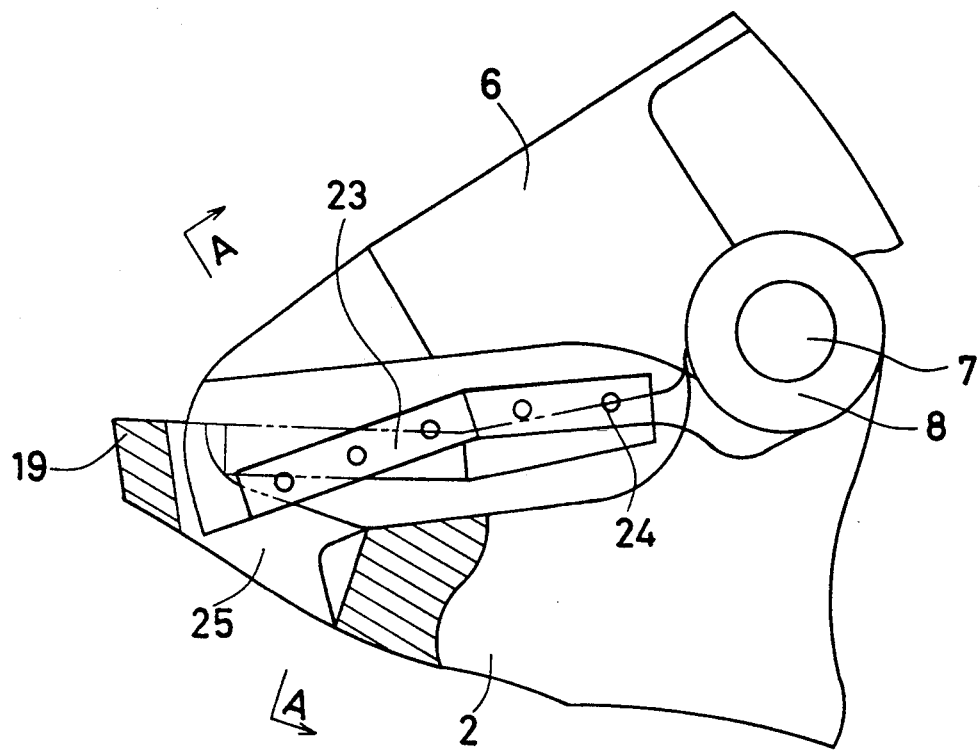
FIG. 3 is a side elevation view of the essential part of FIG. 1.
Figure 4:
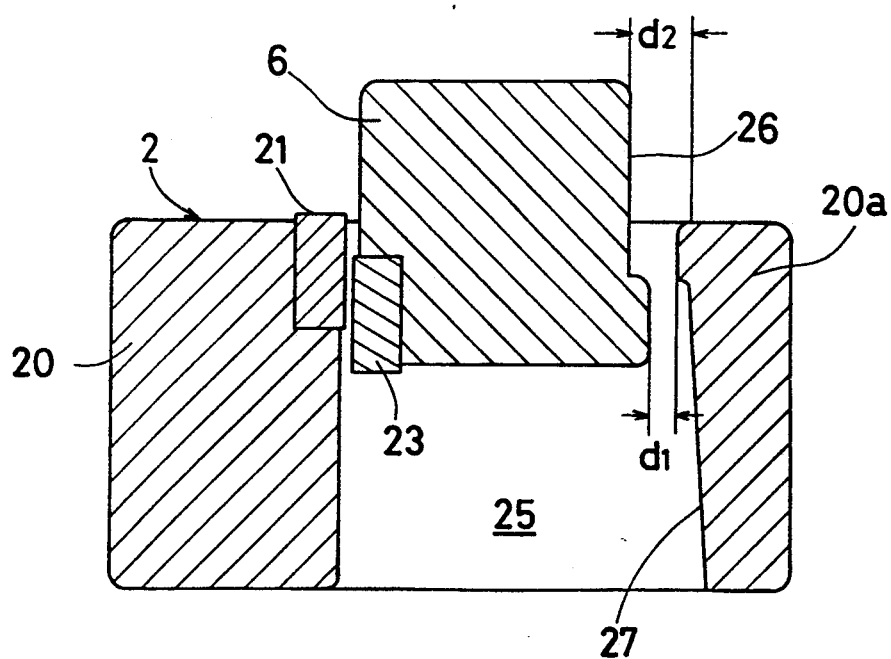
FIG. 4 is a sectional view taken along the line A—A of FIG. 3.

The embodiment illustrated in FIGS. 1 through 4 is well suited for use as a reinforcement cutter for attachment to the arm end of the boom of a power shovel or the like but can be applied to disassembling of chemical plant pipelines, motor vehicles, rolling stock and so on. The overall weight of this cutter is preferably about 3800 kg and the preferred dimensions are about 500 mm at the front end opening and about 720 mm in shearing cutter length.

In the several views of the drawings the reference numeral 1 indicates a cutter body consisting of a stationary jaw 2 at front and a cylinder case 3 at rear. This cutter body 1 is attached to a bracket 5 through a swivel member 4 and is fitted with a movable jaw 6 through a spindle 7 in juxtaposition with said stationary jaw 2. The above construction is now described in further detail.

In the neighborhood of the borderline between the stationary jaw 2 and the cylinder case 3, the cutter body 1 is equipped with a pair of bosses 8, 8, by which said spindle 7 is supported. Furthermore, the bottom of the cylinder case 3 of the cutter body 1 is provided with a cylinder boss 9, by which the rod 11 of a hydraulic cylinder 10 is rotatably supported. This hydraulic cylinder 10 is disposed in generally vertical position within the cylinder case 3 and rotatably connected to the rear part of said movable jaw 6. Therefore, as the hydraulic cylinder 10 is actuated, the movable jaw 6 swings to open or close with respect to the stationary jaw 2. The side wall of the cylinder case 3 is provided with an access port 12 for maintenance of a hose communicating with said hydraulic cylinder 10 and an access hole 13 for maintenance of a swivel hose communicating with said swivel member 4.

The swivel member 4 mentioned above consists of a swivel end plate 14 and a locking end plate 15, so that the reinforcement cutter of the invention can be swung through 360 degrees by said swivel member 4. Built into this swivel end plate 14 is an internal gear not shown, while a hydraulic motor and a swivel joint, not shown, are built into said locking end plate 16. The internal gear mentioned above is turned by the pinion of said hydraulic motor.

The locking end plate 15 is rigidly secured to said supporting bracket 5, which is provided with a boss 16 for an arm pin for connection to the arm of a power shovel not shown and a boss 17 for a link pin (not shown) connected to the hydraulic cylinder disposed adjacent to said arm. Furthermore, the side of this bracket 5 is provided with a rib 18 for a hook for use in attaching and detaching the reinforcement cutter to the end of the arm.

While the above construction is basically the one adopted in reinforcement cutters in general, this embodiment has the following features.

Thus, the stationary jaw 2 is generally tapered and provided with a series of upper lands 19, 20, 20a which are generally configured, as a unit, in the shape of the capital letter L in plan view and surrounding a through-opening 25 to be described hereinafter, and a first and a second stationary jaw shearing cutters 21, 22 are dismountably secured to the inner side of the long lateral land 20. The land 20 forms a long leg of the series, while the land 20a forms a short leg of the series. These stationary jaw shearing cutters 21, 22 are joined to each other, without a gap, in a bent formation in lateral view so that when brought into engagement with movable jaw shearing cutters 23, 24 which are described hereinafter, they are deeply intersected by the corresponding latter cutters with a shear angle. Particularly the first shearing cutters 21, 23 of the stationary and movable jaws overlap deeply to preclude forward sliding of the work in cutting and grip it securely. Furthermore, the forward part of the stationary jaw is provided with said through-opening 25 for prevention of lateral displacement. Thus, it is so constructed that the forward end of the movable jaw 6 may intrude into said through-opening 25 for cutting and the bending angle (shear angle) of said shearing cutters 21, 22, 23, 24 is sufficiently large. Moreover, the movable jaw cutters 23, 24 are prevented from being laterally displaced from the stationary jaw cutters 21, 22 in the course of cutting.

On the other hand, the movable jaw 6 is slender than the stationary jaw 2 and, in addition, tapered. Moreover, one lateral side of the movable jaw 6 along its lower edge is provided with the first and second shearing cutters 23, 24 which are dismountably secured in a bent formation without a gap therebetween in correspondence with said stationary jaw shearing cutters 21, 22.

In the condition that the forward end of the movable jaw 6 is disposed in said through-opening 25, a first clearance $d_1$ (about 2-3 mm) and a second clearance $d_2$ which is comparatively larger and gradually increasing are formed between a lateral surface 26 of the movable jaw 6 which is opposite to the surface on which said movable jaw cutters 23, 24 are disposed and a surface 27 of the stationary jaw which is opposite to the surface on which said stationary jaw cutters 21, 22 are disposed in said through-opening 25.

In cutting, even if a lateral free play takes place (although the movable jaw 6 is made of high-rigidity cast steel, it undergoes some elastic deformation) between the cutters 21, 22 and 23, 24, the first clearance $d_1$ between a first projection 30 on the short leg 20a and a second projection 31 on the jaw 6 enables the forward end of the movable jaw 6 to fit snugly into the through-opening 25. Furthermore, because of the provision of this first clearance $d_1$, there may take place an ingress of the cutting work for example, a steel member) into the first clearance $d_1$ when the forward end of the movable jaw 6 is fitted into the through-opening 25 but, if this happens, the second clearance $d_2$ facilitates insertion of the forward end of the movable jaw 6 into the through-opening 25.

The operation of the above embodiment is now explained. As the hydraulic cylinder 10 is driven on a compression mode, the movable jaw 6 opens with respect to the stationary jaw 2. Then, the reinforcement cutter as a whole is advanced to accept the work in position. Thereafter, as the hydraulic cylinder 10 is driven on an expansion mode, the movable jaw 6 begins to close and first cuts the work with the second cutters 22, 24 from behind the work. In this phase, the rigidity of the work is high, the shearing action generates a forward sliding force and actually gives some slide to the work but, in due course, the ends of the first cutters, 21, 23 begin to intersect each other at a shear angle and, at the same time, the forward end of the movable jaw 6 begins to enter into the through-opening 25 so as to prevent forward sliding of the work. Moreover, the work is cut at a shear angle from the forward part of the work, while the lateral displacement of the cutters 23, 24 is prevented. Therefore, the work can be easily cut, irrespective of its type.

The results of a cutting experiment with the reinforcement cutter of the above embodiment revealed that because the maximum opening between the stationary jaw cutter 20 and the movable jaw cutter 22 is 550 mm, an H steel angle sized, say 500 mm by 200 mm, could be easily cut. It should be understood that the relative arrangement of the stationary jaw and the movable jaw may be reversed, if desired.

When a cutting work such as a steel reinforcement is to be cut with a scissor-type shearing cutter, the work tends to slide forward within the opening angle of the cutter. With the reinforcement cutter of the invention, the first cutter means respectively secured to the upper and lower jaws cut with a shear angle from the forward direction of the work so that even a high-rigidity work can be easily cut. Moreover, since the forward end of the upper jaw intrudes into the through-opening, the lateral play of the shearing cutter means is precluded. Furthermore, the bending angle (shear angle) of the first and second cutter means is large enough to insure a positive grip on the work. Whereas, in the prior art cutter, the upper and lower cutter means are sometimes prevented from intersecting due to the failure of the lateral stop means to mesh properly, the reinforcement cutter of the invention having a clearance between the surface of the short land of the lower jaw which is opposite to the long land where cutter means are disposed and the surface of the upper jaw which is opposite to the surface on which the cutter means are disposed enables the forward end of the upper jaw to intrude smoothly into the through-opening of the lower jaw by providing for the aforesaid elastic deformation, even if the work is partially entrapped between the upper and lower cutter means so that the cutting action is not interfered with. Therefore, the cutter of the invention cuts even an extremely hard work.

Moreover, since one upper surface of the lower jaw is flat and open except at the aforesaid short land, the cut work is readily removed by the lateral shear pressure to facilitate a continuous cutting operation. Particularly, the aforesaid short land prevents lateral displacement of the upper jaw from the beginning of cutting with the first cutter means so that cutting by the first cutter means is rendered smooth.

What is claimed is:

1. A scissor-action reinforcement cutter comprising;
   a lower jaw having a cutting section with an opposed inner lateral surface and a supporting section with a pivot disposed therebetween;
   a supporting bracket disposed proximate said supporting end of said lower jaw and means disposed between said lower jaw and said supporting bracket for allowing said lower jaw to rotate relative to said supporting bracket;
   an upper jaw having a cutting section with an opposed inner lateral surface and an operating section, said upper jaw being mounted intermediate said cutting and operating sections on said pivot of said lower jaw;
   a hydraulic cylinder having a first end pivoted on said lower jaw and a second end mounted to said operating end of said upper jaw; and
   first and second shearing cutter means dismountably secured to each of said opposed inner lateral surfaces on said cutting sections of said upper and lower jaws in a bent formation in the longitudinal direction of the jaw, said lower jaw being provided with a through-opening in a forward part of said cutting section to accept a forward end portion of said cutting section of said upper jaw in such a manner that said first shearing cutter means of said upper and lower jaws intersects each other to grip a workpiece to be cut, said lower jaw being provided at said cutting section with a land series configured generally in the shape of the capital letter L around said through-opening, said shearing cutter means being disposed along a long lateral side of said land series, clearance being provided between a short side of said land series which is opposite to the side of the lower jaw on which the corresponding shearing cutter means is disposed and the side of said upper jaw which is opposite to the side on which the corresponding shearing cutter means is disposed.

2. The scissor cutter of claim 1, wherein said land series includes a short leg extending in the same direction as said long lateral side, the short leg having a first projection thereon extending toward said long leg, and a second projection on said cutting section of said upper jaw, said second projection extending toward said first projection when said cutting sections are initially in proximity and clearing said first projection by a first selected distance which is less than a second selected distance by which said first projection clears said cutting section of said upper jaw when said projections are moved past one another to fully close said jaws.

* * * * *